United States Patent
Weiss (10) Patent No.: US 9,568,063 B2
(45) Date of Patent: Feb. 14, 2017

(54) VIBRATION DAMPER USING SHOCKLIKE INTERACTION

(75) Inventor: Oliver Weiss, Wendelstein (DE)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 1079 days.

(21) Appl. No.: 13/576,771

(22) PCT Filed: Dec. 13, 2010

(86) PCT No.: PCT/US2010/060049
§ 371 (c)(1),
(2), (4) Date: Aug. 2, 2012

(87) PCT Pub. No.: WO2011/100024
PCT Pub. Date: Aug. 18, 2011

(65) Prior Publication Data
US 2012/0298392 A1    Nov. 29, 2012

(30) Foreign Application Priority Data
Feb. 11, 2010 (DE) .................. 20 2010 002 297

(51) Int. Cl.
*B25D 17/24* (2006.01)
*F16F 7/10* (2006.01)

(52) U.S. Cl.
CPC ....................... *F16F 7/10* (2013.01)

(58) Field of Classification Search
CPC .......... B25F 5/006; B25F 5/026; B25D 17/24; B25D 17/043; F16F 7/10
USPC ................... 173/162.1, 162.2, 170
See application file for complete search history.

(56) References Cited

U.S. PATENT DOCUMENTS

| | | | |
|---|---|---|---|
| 3,972,119 A * | 8/1976 | Bailey | 30/381 |
| 6,439,359 B1 | 8/2002 | Kato et al. | |
| 2001/0026039 A1 | 10/2001 | Hasegawa et al. | |
| 2005/0132945 A1 | 6/2005 | Yamada et al. | |
| 2005/0253317 A1 | 11/2005 | Yasumoto et al. | |
| 2007/0221460 A1 | 9/2007 | Guo et al. | |
| 2008/0023899 A1 | 1/2008 | Hasegawa et al. | |

FOREIGN PATENT DOCUMENTS

| | | |
|---|---|---|
| DE | 19882785 B4 | 12/2005 |
| DE | 60107891 T2 | 12/2005 |
| DE | 102005022134 A1 | 1/2006 |
| DE | 102007000147 A1 | 10/2007 |
| EP | 1132644 A2 | 9/2001 |

(Continued)

OTHER PUBLICATIONS

An International Search Report dated Mar. 22, 2011 in International Application No. PCT/US2010/060049.

*Primary Examiner* — Michelle Lopez
(74) *Attorney, Agent, or Firm* — Hauptman Ham, LLP (57) ABSTRACT

The invention relates to a vibration damper for a machine component which vibrates in the operating state thereof, wherein a damping mass arrangement is coupled to the machine component via a clearance and wherein the excitation of the damping mass arrangement in at least one vibration direction originates from a substantially shocklike interaction between the damping mass arrangement and the machine component. The invention leads to an increase in dampening efficiency due to the utilization of shock-like transfer of vibration energy.

27 Claims, 4 Drawing Sheets

(56) References Cited

FOREIGN PATENT DOCUMENTS

| EP | 1415768 A1 | 5/2004 |
|----|------------|--------|
| FR | 2596122 A1 | 9/1987 |
| GB | 2409835 A  | 7/2005 |

\* cited by examiner

VIBRATION DAMPER USING SHOCKLIKE INTERACTION

RELATED APPLICATIONS

The present application is based on International Application No. PCT/US2010/060049, filed Dec. 13, 2010 and claims priority from, German Application Number 20 2010 002 297.5, filed Feb. 11, 2010.

The invention relates to a vibration damper according to the precharacterizing clause of claim 1 and to a structural member arrangement according to the precharacterizing clause of claim 18.

Numerous machine components, in the operating state thereof, produce vibrations which are transmitted via the machine housing, a handle arrangement or the like to the machine operator. Vibrations of this type may be a considerable risk to health. An example thereof is the "white finger disease" caused by damaged nerves and cells.

In the present case, the term "vibrations" is to be understood as meaning in very general terms mechanical vibrations which can be felt by the machine operator. Said vibrations may contain linear and nonlinear vibration components.

The above vibrations arise, for example, in striking tools, such as an impact drilling machine, a hammer drill, a chisel hammer or the like. The striking and optionally simultaneously rotating engagement with the particular material being drilled gives rise to vibrations on the handle of the machine component, which vibrations should be reduced.

The known vibration damper for a hammer drill (EP 1 415 768 A1), on which the invention is based, operates according to the functional principle of a vibration absorber. A vibration absorber of this type is equipped with a damping mass arrangement which is mounted in a spring-loaded manner in at least one direction of movement. The spring-loaded damping mass arrangement forms a system which is capable of vibration and can be excited by the vibrations of the machine component to provide damping vibrations.

An inherent disadvantage of the known vibration damper is the fact that a satisfactory damping result can be obtained only in a very narrow frequency range of linear vibrations.

However, vibration measurements on striking tools have revealed that linear and nonlinear vibrations of innumerable frequencies and directions occur in the operating state. Even if a vibration with a preferred frequency and a preferred direction can be determined in certain cases, seen at least statically, the damping of said vibration is generally not satisfactory.

The invention is based on the problem of refining and developing the known vibration damper in such a manner that the damping behavior over a wide range of linear and nonlinear vibrations is improved.

The above problem is solved with a vibration damper according to the precharacterizing clause of claim 1 by means of the features of the characterizing part of claim 1.

It is essential that the coupling between the damping mass arrangement and the machine component has such a clearance, at least in the operating state, that the excitation of the damping mass arrangement in at least one vibration direction originates from a substantially shocklike interaction between the damping mass arrangement and the machine component.

Vibration energy is therefore not transmitted from the machine component to the damping mass arrangement continuously but rather at discrete time intervals upon the shocklike impact against the respective clearance limit after passage through the clearance. The order of magnitude of the time intervals between two above shocks corresponds here to the order of magnitude of the period durations of the vibrations.

The effect which can be achieved by the clearance-affected coupling according to the proposal is that both linear and nonlinear vibration components contribute to exciting the damping mass to provide damping vibrations, i.e. the damping mass is subjected to energy, which permits the damping even of nonlinear vibration components. This effect has also been confirmed in tests.

The term "clearance" should be understood here as meaning that, during passage through the clearance, the damping mass arrangement is essentially free from the machine component. There is no obstacle to the damping mass arrangement being in engagement with a damping arrangement or the like as long as the damping arrangement does not measurably affect the deflection of the damping mass arrangement.

The clearance limit may be a hard, inflexible limit or else a flexible limit. The last-mentioned case is present in particular if the clearance limit is assigned an elastically deformable damping material, as will be explained.

The term "shocklike" should be interpreted broadly and comprises every impact of the damping mass arrangement against the clearance limits such that a change in movement of the damping mass arrangement is caused.

Of course, in actual systems, it can never be entirely ruled out that the coupling between the damping mass arrangement and the machine component optionally comprises, due to temperature effects, further coupling mechanisms, such as friction, which may result in an additional excitation of the damping mass arrangement. Against this background, the teaching according to the proposal should be understood as meaning that the excitation of the damping mass arrangement very predominantly originates from the above shocklike interaction.

As a rule, it will be possible to assign a preferred vibration direction to the vibrations of the machine component, as seen statically, wherein the above shocklike interaction is intended to be effective preferably at least in said preferred vibration direction. It is correspondingly then preferably provided, according to claim 2, that the clearance is realized at least in the preferred vibration direction.

In view of the vibrations which are generally present in all of the other directions, it is provided in a variant embodiment in the particularly preferred refinement according to claim 3 that the clearance is realized in all directions in space.

It is specified in claim 4 that the order of magnitude of the clearance lies in the order of magnitude of the amplitudes of the vibrations to be damped and is intended in particular to be smaller than the maximum amplitude of the vibrations to be damped. A particularly effective damping behavior has been shown therewith in tests.

Assuming that the clearance limits, on the one hand, and the contact region of the damping mass arrangement, on the other hand, were infinitely hard, then, when the damping mass arrangement impacts against the clearance limit, an ideal impact with a correspondingly abrupt change in movement of the damping mass arrangement would actually occur. Depending on the refinement, this may lead to undesirable vibrations within the damping mass arrangement, and therefore it may be advantageous in certain cases to assign an in particular elastic damping material to the clearance limits (claim 5).

The further preferred refinements according to claims 9 to 16 relate to advantageous structural refinements of the vibration damper according to the proposal.

However, the clearance-affected coupling according to the proposal also has an entirely different effect which is of interest in particular for structural member arrangements, such as handle arrangements for machine components. With the shocklike transmission, the effect can be observed that vibrations having linear and nonlinear components are harmonized, i.e. linearized, at least to a certain degree, which corresponds to a first filtering. Harmonized vibrations of this type can easily be handled in respect of an optionally further downstream filtering or the like.

In accordance with a further teaching according to claim 18, which likewise has independent importance, a structural member arrangement, such as a handle arrangement, with a structural member component, such as a handle, is therefore claimed, said structural member arrangement being coupled via an above clearance to the machine component such that the described filtering of the linear and nonlinear vibrations can be achieved.

In the particularly preferred refinement according to claim 19, the structural member arrangement serves at the same time as a vibration damper for the machine component with a damping mass arrangement. A particularly efficient and at the same time compact arrangement in respect of the vibration damping can therefore be achieved.

The invention is explained in more detail below with reference to a drawing which merely illustrates exemplary embodiments. In the drawing

The vibration damper according to the proposal and illustrated in the drawing in a total of six preferred embodiments is assigned to a machine component 1 which is merely indicated in the drawing and vibrates in the operating state thereof. It is the object of the vibration damper to reduce the vibrations of the machine component 1.

In the present case, the term "vibrating machine component" should be understood in broad terms. This includes any arrangements vibrating in the operating state thereof. Examples thereof include tools, in particular striking tools, such as impact drilling machines or hammer drills, machine tools or the like. However, examples of use in the sphere of vehicles, in particular motor vehicles or motorcycles, are also conceivable here. Accordingly, a motor vehicle or motorcycle may also be understood as meaning the machine component here.

All of the vibration dampers illustrated have a damping mass arrangement 2 which, when the vibration damper is installed, is coupled to the machine component 1 and can thus be set into damping vibrations by means of vibrations of the machine component 1. The possible structural refinements of the coupling are explained in detail further below. To this extent, the basic arrangement also corresponds to a classic vibration absorber.

It is essential that, according to the proposal, the coupling between the damping mass arrangement 2 and the machine component 1 has such a clearance 3, at least in the operating state, that the excitation of the damping mass arrangement 2 in at least one vibration direction originates from a substantially shocklike interaction between the damping mass arrangement 2 and the machine component 1. The clearance 3 and the clearance limits 4 can be seen only in the detailed view according to FIG. 1.

Figure 1:
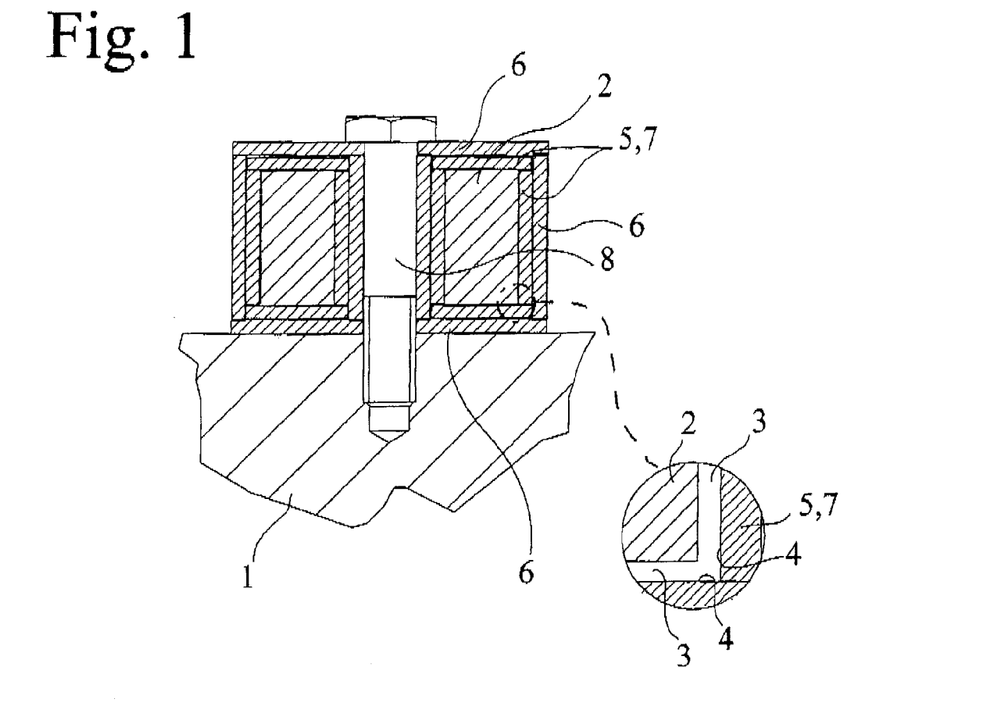
FIG. 1 shows a sectional illustration of a first embodiment of a vibration damper according to the proposal.
Figure 2:
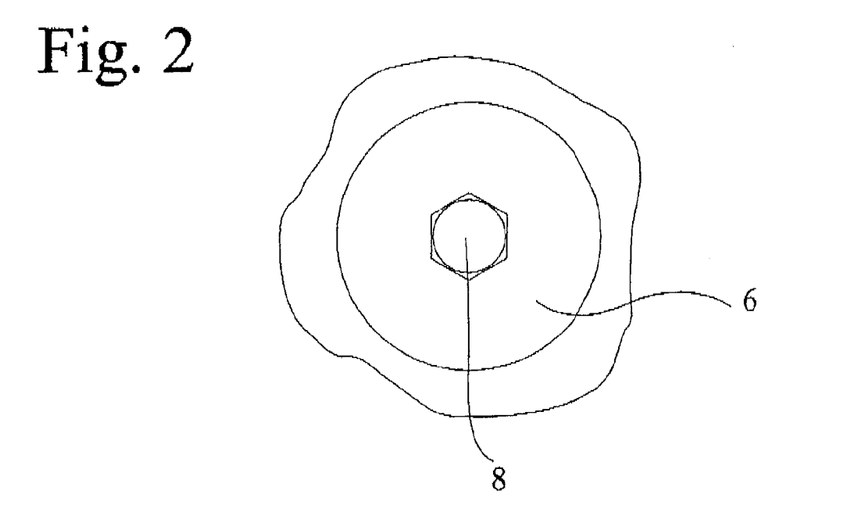
FIG. 2 shows a top view of the vibration damper according to FIG. 1.

The clearance 3 is shown only on one side of the damping mass arrangement 2 in FIG. 1. However, "clearance" below always means the total clearance through which the damping mass arrangement 2 can pass.

The machine component 1 preferably has an above preferred vibration direction. In the case of the impact drilling machine or hammer drill, the preferred vibration direction runs parallel to the drill bit or chisel axis. In a particularly preferred refinement, the clearance 3 is then provided at least in the preferred vibration direction.

However, particularly good results have been able to be achieved in tests by the clearance 3 being provided in at least two directions in space, in particular in all directions in space. It is preferably also provided for the clearance 3 to be provided in all rotary degrees of freedom. The above shocklike interaction therefore has a corresponding effect in all conceivable directions.

The order of magnitude of the clearance 3 here and preferably lies in the order of magnitude of the amplitudes of the vibrations to be damped. The correct configuration of the clearance 3, which can best be determined in tests, obtains particular importance here. Particularly good results have been demonstrated if the clearance 3 is smaller than the maximum amplitude of the vibrations to be damped. Given certain boundary conditions, it may also be advantageous for the clearance 3 to be smaller than the average amplitude of the vibrations to be damped.

It has already been pointed out further above that the vibration damper can be assigned an elastically deformable damping arrangement 5 with a corresponding damping material, which damping arrangement can be deformed by the damping vibrations of the damping mass arrangement 2. It can therefore be ruled out in particular that vibrations of certain frequencies are undesirably excited within the damping mass arrangement 2.

The damping arrangement 5 here and preferably is assigned to the machine-side clearance limits 4. The clearance limits 4 are therefore formed here by the damping arrangement 5. As a result, it can easily be ensured that the damping vibration is kept free from certain frequencies, in particular from particularly high frequencies.

The damping material of the damping arrangement is preferably composed of a flexible plastics material, in particular of a foam material.

In principle, it may also be advantageous to assign the damping arrangement 5 to the damping mass arrangement 2. This may be advantageous in terms of manufacturing. For example, the damping mass arrangement could be encapsulated with an elastically deformable plastics material by injection molding.

In all of the exemplary embodiments illustrated, the damping mass arrangement 2 can be deflected in all directions in space, in a manner deforming the damping arrangement 5. In principle, it may also be provided that the damping mass arrangement 2 can be deflected in only two directions in space, in a manner deforming the damping arrangement 5. All rotary degrees of freedom are preferably in turn included thereby.

The configuration of the clearance 3, on the one hand, and of the damping arrangement 5, on the other hand, such that the degrees of freedom of movement are provided by passage through the clearance 3 and subsequently by deformation of the damping arrangement 5 in all directions in space is particularly preferred here. This takes into account the circumstance that, as explained above, in some applications vibrations have to be damped in all directions in space.

It can be provided, in principle, that the damping arrangement 5 always bears against the damping mass arrangement 2. The correct configuration of the damping material is then arrived at, namely in such a manner that the damping arrangement 5, when passing through the clearance 3, essentially has no effect on the damping vibration, and that the damping arrangement 5, only upon reaching the region of the clearance limit, causes a change in movement of the damping mass arrangement. Such a behavior corresponds to the behavior of a progressive spring.

It is also conceivable that, in the inoperative state, i.e. when there is no vibration, there is no clearance between the damping mass arrangement 2 and the machine component 1 and that the clearance 3 is formed only in the operating state. The clearance 3 can be formed here for example by the elastic resetting of the damping material of the damping arrangement 5 being able to take place only after a certain amount of relaxation time. Given a suitable configuration, a certain clearance 3 is formed only after the machine component 1 has been started up, said clearance being maintained continuously via the damping vibrations of the damping mass arrangement 2.

In all of the embodiments illustrated, a support 6 is provided for the damping mass arrangement 2, which support, when the vibration damper is installed, is coupled, here and preferably, rigidly to the machine component 1. The clearance 3 under discussion is produced by the damping mass arrangement 2 and the support 6 being coupled with an appropriate clearance 3, at least in the operating state. The above-discussed damping arrangement 5, here at least one damping element 7 of the damping arrangement 5, is arranged between the damping mass arrangement 2 and the support 6.

Numerous advantageous fastening means are conceivable for fastening the support 6 to the machine component 1. In the exemplary embodiments illustrated in FIGS. 1 to 5, a screw 8 extending through the support 6 is provided. FIG. 6 shows an arrangement in which a screw 8 of this type is an integral part of the vibration damper. FIG. 7 shows an arrangement in which the vibration damper is fastened via a type of tightening strap 9.

In the preferred refinements illustrated in FIGS. 1, 2, 6 and 7, the support 6 is configured as a housing in which the damping mass arrangement 2 is in each case arranged. In these exemplary embodiments, the damping arrangement 5 comprises planar damping elements 7 with which the respective housing is lined.

The exemplary embodiments which are illustrated in FIGS. 1, 2, 6 and 7 and in which the damping mass arrangement 2 is encapsulated in a support 6 configured as a housing result in very particularly robust solutions. In particular, external influences, such as moisture and dirt, do not have any effect here on the damping behavior of the vibration damper.

Figure 3:
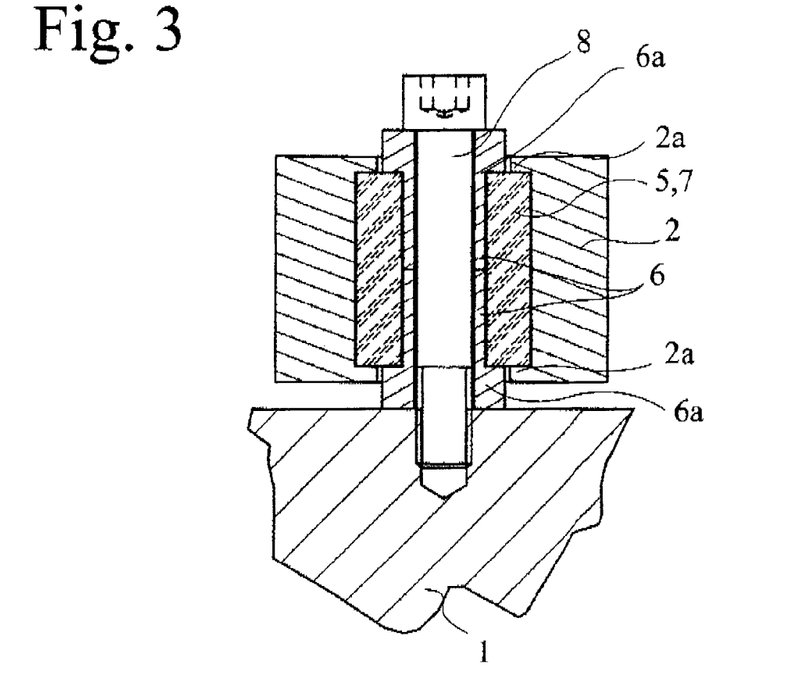
FIG. 3 shows a sectional view of a second embodiment of a vibration damper according to the proposal.
Figure 4:
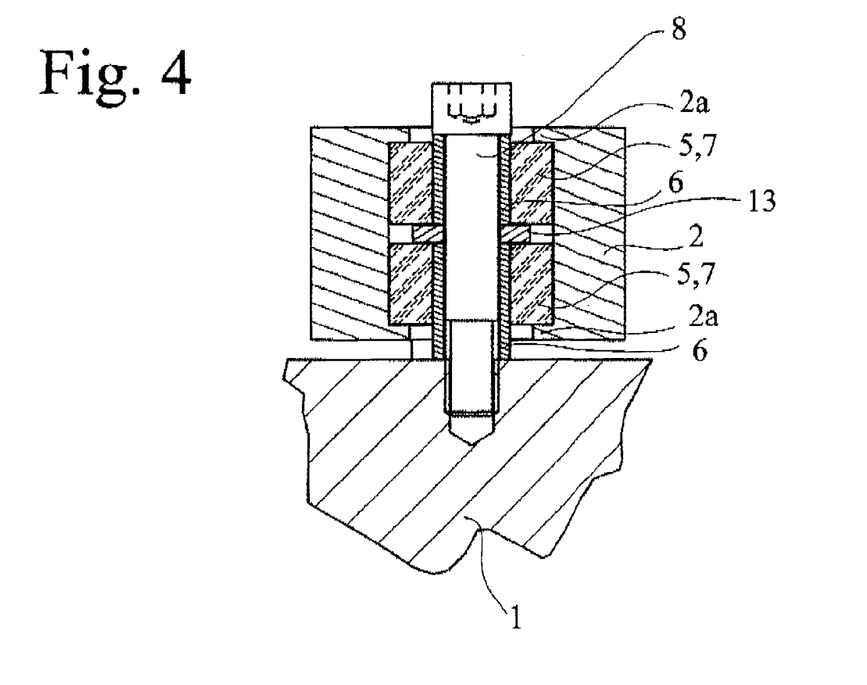
FIG. 4 shows a sectional view of a third embodiment of a vibration damper according to the proposal.
Figure 5:
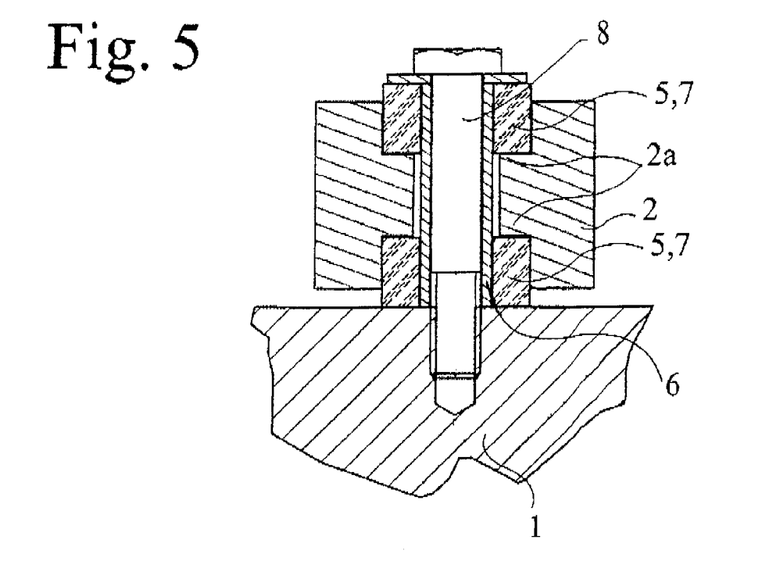
FIG. 5 shows a sectional view of a fourth embodiment of a vibration damper according to the proposal.
Figure 6:
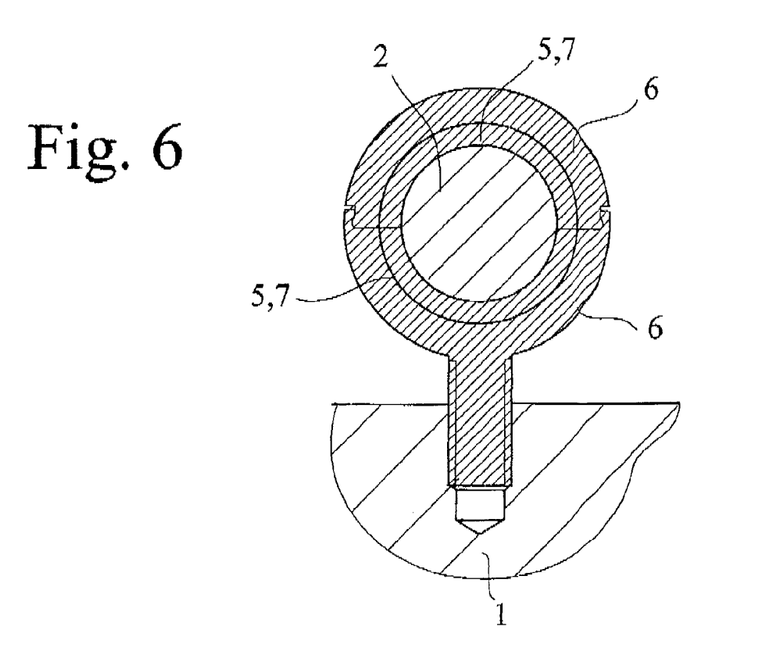
FIG. 6 shows a sectional view of a fifth embodiment of a vibration damper according to the proposal.
Figure 7:
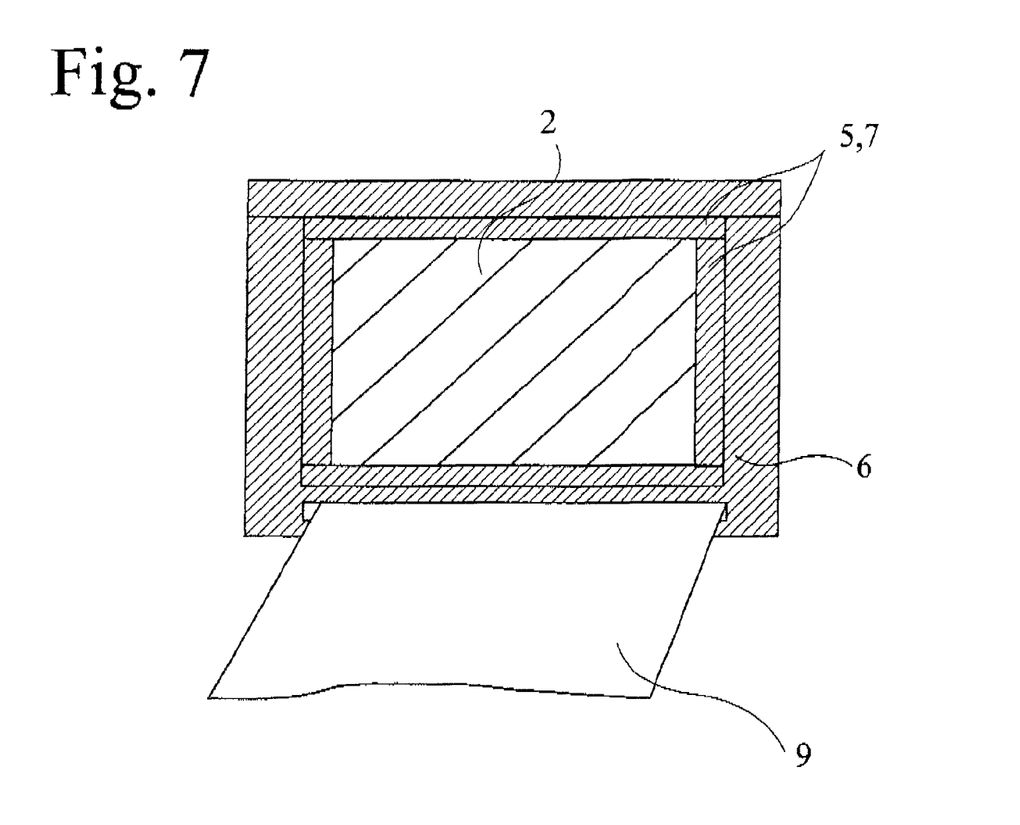
FIG. 7 shows a sectional view of a sixth embodiment of a vibration damper according to the proposal.

The preferred exemplary embodiments according to FIGS. 3 to 5 show a structural reversal of the exemplary embodiments illustrated in FIGS. 1, 2, 6 and 7. The support 6 is of sleeve-like configuration here, wherein the damping mass arrangement 2 and the damping arrangement 5 which is present here are arranged on the outside of the support 6. The especially simple construction is advantageous here.

In the exemplary embodiments illustrated in FIGS. 1 to 5, the damping mass arrangement 2 is of substantially annular configuration and is arranged concentrically with respect to the support 6. By this means, in particular, the fastening can be realized in a structurally simple manner.

Correspondingly, the damping elements 7 of the damping arrangement 5 are preferably also of substantially annular configuration, wherein the respective damping element 7 is arranged between the support 6 and the damping mass arrangement 2. Provision may be made here for there to be two substantially annular damping elements 7 arranged coaxially with respect to each other, as illustrated in FIGS. 4 and 5.

As already discussed, the damping elements 7 of all of the exemplary embodiments illustrated can be deformed in all directions in space by deflection of the damping mass arrangement 2, which is associated with corresponding degrees of freedom of movement for the damping mass arrangement 2. In the exemplary embodiment illustrated in FIGS. 1 and 2, this is realized by the support 6 which is configured as a housing being completely lined on the inside with damping elements 7.

In the exemplary embodiments illustrated in FIGS. 3 and 4, the degree of freedom of movement upward and downward in the drawing originates from a shearing stress of the respective damping element 7. For the fixing, relating thereto, of the damping elements 7, corresponding steps 6a, 2a are provided both in the support 6 and in the damping mass arrangement 2, the steps bringing about a corresponding form-fitting connection with the respective annular damping element 7. It is of interest here that, in the exemplary embodiment illustrated in FIGS. 3 and 4, the support 6 is of two-part design, wherein the two, in each case sleeve-like parts are separated by a washer 13 in the exemplary embodiment illustrated in FIG. 4.

FIG. 5 shows a further possibility for positioning the damping mass arrangement 2, on the one hand, and the two annular damping elements 7, on the other hand. It is essential in this case that the damping element 7 which faces the machine component 1 rests on the machine component 1, this being associated with an additional interaction between the damping mass arrangement 2 and the machine component 1.

A homogeneous damping behavior in all directions in space can be obtained by the exemplary embodiment illustrated in FIG. 6, in which the damping mass arrangement 2 is configured as a ball, wherein the support 6 which is configured here and preferably as a housing and the preferably provided at least one damping element 7 between the damping element 7 and the support 6 are configured as hollow balls.

The damping mass arrangement 2 can be integrated in a particularly advantageous manner into a structural element which is already present, in particular into a housing, into a covering, into a wall element or the like of the machine component. An above, separate support 6 can then be omitted.

Numerous possibilities are conceivable for the configuration of the damping mass arrangement 2. The damping mass arrangement 2 here and preferably consists of a single-piece mass element. However, depending on the boundary conditions, the damping mass arrangement 2 may also be of multi-part configuration, preferably of two-part configuration.

In principle, the damping mass arrangement 2 may be provided as an additional part. However, in a particularly preferred configuration, the damping mass arrangement 2 is part of a structural member arrangement for the machine component 1, in particular of the handle arrangement, which is present in any case, of the machine component. This enables the costs for realizing the solution according to the proposal to be reduced to a minimum.

In the embodiments illustrated in FIGS. 3 to 5, this could involve, for example, the handle arrangement of an impact drilling machine, wherein the handle of the impact drilling machine—in a highly abstract way of looking at the situation—is in each case the damping mass arrangement 2. In principle, the handle vibrations which are harmonized in the above-described manner can be controlled, given an appropriate configuration, in such a manner that said vibrations are not annoying to the machine operator.

It should also be pointed out that, in one variant embodiment, the clearance may also be composed of a series of consecutively connected partial clearances. This means that partial clearances which can complement one another to form the clearance in question can be provided at various points in the force flux profile between the machine component 1 and the damping mass arrangement 2.

The solution according to the proposal provides a possibility, which is simple to realize, for reducing machine vibrations. This has, for example, advantageous effects on the operability of tools or the like. However, the reduction of nonlinear vibration components, in particular, is also associated with a reduction in wear. Finally, an undesirable radiation of sound can also be effectively reduced with the solution according to the proposal.

According to a further teaching, which likewise obtains independent importance, a structural member arrangement, in particular a handle arrangement, with a structural member component, in particular a handle, for a machine component which vibrates in the operating state thereof, in particular an impact drilling machine, is claimed.

In very general terms, it is essential according to this further teaching that, in the installed state, the structural member component is coupled to the machine component 1 and is excited by the vibrations of the machine component 1 via the coupling to provide vibrations. In this case, the coupling between the structural member component and the machine component 1 again has such a clearance 3, at least in the operating state, that the excitation of the structural member component in at least one vibration direction originates from a substantially shocklike interaction between the structural member component and the machine component 1. Therefore, as discussed above, effective filtering in particular of nonlinear vibrations can be achieved. Reference should be made to all of the above embodiments for a possible configuration of the clearance.

In a particularly preferred configuration, provision is made for the structural member component to be configured as an above-discussed damping mass arrangement 2 which is excited by the vibrations of the machine component 1 via the coupling to provide damping vibrations. To this extent, the structural member component serves in addition as a vibration damper within the above-described meaning. Reference should be made to all of the above embodiments with respect to the vibration damper according to the proposal.

The invention claimed is:

1. A vibration damper for a machine component which vibrates in the operating state thereof, in particular for an impact drilling machine or the like, wherein a damping mass arrangement is provided, which damping mass arrangement, when the vibration damper is installed, is coupled to the machine component and is excited by the vibrations of the machine component via the coupling to provide damping vibrations, characterized in that the coupling between the damping mass arrangement and the machine component has such a clearance, at least in the operating state, that the excitation of the damping mass arrangement in at least one vibration direction originates from a substantially shocklike interaction between the damping mass arrangement and the machine component, wherein the coupling between the damping mass arrangement and the machine component does not have any clearance in the inoperative state, and wherein the clearance is formed only in the operating state by relaxation of the damping material.

2. The vibration damper as claimed in claim 1, wherein the vibrations of the machine component have a first vibration direction, and wherein the clearance is provided at least in the first vibration direction.

3. The vibration damper as claimed in claim 1, wherein the clearance is provided in at least two directions in space, and preferably in that the clearance is provided in all directions in space.

4. The vibration damper as claimed in claim 1, wherein an order of magnitude of the clearance lies in an order of magnitude of the amplitudes of the vibrations to be damped, and preferably in that the clearance is smaller than the maximum amplitude of the vibrations to be damped, or in that the clearance is smaller than the average amplitude of the vibrations to be damped.

5. The vibration damper as claimed in claim 1, wherein the coupling between the damping mass arrangement and the machine component does not have any clearance in the inoperative state, and wherein the clearance is formed only in the operating state, in particular by relaxation of the damping material.

6. The vibration damper as claimed in claim 1, wherein the damping mass arrangement is configured as a ball.

7. The vibration damper as claimed in claim 1, wherein the damping mass arrangement is part of a structural member arrangement, in particular of the handle arrangement of a machine component.

8. The vibration damper as claimed in claim 1, wherein the coupling between the damping mass arrangement and the machine component is such that a clearance is formed during an operation state, and a zero clearance is present in the inoperative state.

9. The vibration damper as claimed in claim 1, wherein the coupling between the damping mass arrangement and the machine component does not have any clearance in the inoperative state, and the clearance is formed only in the operating state.

10. The vibration damper as claimed in claim 1, wherein the vibration damper includes a housing encompassing the damping mass arrangement, wherein the housing shields the damping mass arrangement from non-vibrational loading.

11. The vibration damper as claimed in claim 1, wherein the vibration damper is configured so that when attached to the tool, the damping mass arrangement is isolated from structural loads.

12. The vibration damper as claimed in claim 1, wherein the vibration damper is a modular component configured for attachment to any other component at only one location.

13. The vibration damper as claimed in claim 1, wherein the vibration damper includes a first surface configured to directly contact a mating surface of the machine component, wherein the clearance is located between the first surface and the damping mass arrangement.

14. The vibration damper as claimed in claim 1, wherein the vibration damper includes a surface configured to directly contact a mating surface of the machine component, wherein the clearance extends to the damping mass arrangement in a direction normal to a tangent plane of the first surface.

15. A device, comprising,
a drilling machine including the vibration damper of claim 1, wherein:
the drilling machine is the impact drilling machine.

16. A vibration damper for a machine component which vibrates in the operating state thereof, in particular for an impact drilling machine or the like, wherein a damping mass arrangement is provided, which damping mass arrangement, when the vibration damper is installed, is coupled to the machine component and is excited by the vibrations of the machine component via the coupling to provide damping vibrations, characterized in that the coupling between the damping mass arrangement and the machine component has such a clearance, at least in the operating state, that the excitation of the damping mass arrangement in at least one vibration direction originates from a substantially shocklike interaction between the damping mass arrangement and the machine component, wherein an elastically deformable damping arrangement is provided, which damping arrangement can be deformed by the damping vibrations of the damping mass arrangement, and preferably in that the damping arrangement is assigned to machine-side clearance limits or to the damping mass arrangement, and furthermore preferably in that the damping material of the damping arrangement is composed of a flexible plastics material, and furthermore preferably of a foam material, wherein a support is provided for the damping mass arrangement, which support, when the vibration damper is installed, is coupled, in particular rigidly, to the machine component, and wherein the damping mass arrangement and the support are coupled with the clearance, at least in the operating state, and preferably in that the damping arrangement, in particular a damping element of the damping arrangement, is arranged between the damping mass arrangement and the support, and wherein at least one of:
(i) the support is of sleeve-like configuration, and wherein the damping mass arrangement and the damping arrangement are arranged on the outside of the support;
(ii) the damping arrangement comprises at least one substantially annular damping element which is/are arranged between the support and the damping mass arrangement, and preferably in that the damping arrangement comprises two substantially annular damping elements which are arranged coaxially with respect to each other; or
(iii) the support is of sleeve-like configuration, and wherein the damping mass arrangement is arranged on the outside of the support.

17. The vibration damper as claimed in claim 16, wherein the damping mass arrangement can be deflected in at least two directions in space, preferably in all directions in space, in a manner deforming the damping arrangement.

18. The vibration damper as claimed in claim 16, wherein the support is configured as a housing in which the damping mass arrangement is arranged, and preferably in that the damping arrangement comprises in particular planar damping elements with which the housing is lined.

19. The vibration damper as claimed in claim 16, wherein the support is of the sleeve-like configuration, and wherein the damping mass arrangement and the damping arrangement are arranged on the outside of the support.

20. The vibration damper as claimed in claim 16, wherein the damping arrangement comprises the at least one substantially annular damping element which is/are arranged between the support and the damping mass arrangement, and preferably in that the damping arrangement comprises the two substantially annular damping elements which are arranged coaxially with respect to each other.

21. The vibration damper as claimed in claim 16, wherein the support is of the sleeve-like configuration, and wherein the damping mass arrangement is arranged on the outside of the support.

22. The vibration damper as claimed in claim 16, wherein the damping mass arrangement is configured as a ball, wherein the vibration damper further comprises a support configured as a housing, and wherein the support and the at least one damping element are configured as a hollow ball.

23. The vibration damper as claimed in claim 16, wherein the coupling between the damping mass arrangement and the machine component does not have any clearance in the inoperative state, and wherein the clearance is formed only in the operating state by relaxation of the damping material.

24. A vibration damper for a machine component which vibrates in the operating state thereof, in particular for an impact drilling machine or the like, wherein a damping mass arrangement is provided, which damping mass arrangement, when the vibration damper is installed, is coupled to the machine component and is excited by the vibrations of the machine component via the coupling to provide damping vibrations, characterized in that the coupling between the damping mass arrangement and the machine component has such a clearance, at least in the operating state, that the excitation of the damping mass arrangement in at least one vibration direction originates from a substantially shocklike interaction between the damping mass arrangement and the machine component,
wherein an elastically deformable damping arrangement is provided, which damping arrangement can be deformed by the damping vibrations of the damping mass arrangement,
wherein a support is provided for the damping mass arrangement, which support, when the vibration damper is installed, is coupled, in particular rigidly, to the machine component, and
wherein at least one of:
(i) the support is of sleeve-like configuration, and wherein the damping mass arrangement and the damping arrangement are arranged on an outside of the support;
(ii) the damping arrangement comprises at least one substantially annular damping element which is/are arranged between the support and the damping mass arrangement, and preferably in that the damping arrangement comprises two substantially annular damping elements which are arranged coaxially with respect to each other; or
(iii) the support is of sleeve-like configuration, and wherein damping mass arrangement is arranged on the outside of the support.

25. The vibration damper as claimed in claim 24, wherein the support is of the sleeve-like configuration, and wherein the damping mass arrangement and the damping arrangement are arranged on the outside of the support.

26. The vibration damper as claimed in claim 24, wherein the damping arrangement comprises the at least one substantially annular damping element which is/are arranged between the support and the damping mass arrangement, and preferably in that the damping arrangement comprises the two substantially annular damping elements which are arranged coaxially with respect to each other.

27. The vibration damper as claimed in claim 24 wherein the support is of the sleeve-like configuration, and wherein the damping mass arrangement is arranged on the outside of the support.

* * * * *